(12) United States Patent
Penn

(10) Patent No.: US 7,993,014 B2
(45) Date of Patent: Aug. 9, 2011

(54) PRISM FOR HIGH CONTRAST PROJECTION

(75) Inventor: Steven M. Penn, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 12/710,444

(22) Filed: Feb. 23, 2010

(65) Prior Publication Data

US 2010/0149626 A1 Jun. 17, 2010

Related U.S. Application Data

(62) Division of application No. 11/739,292, filed on Apr. 24, 2007, now Pat. No. 7,665,850, which is a division of application No. 10/331,832, filed on Dec. 30, 2002, now Pat. No. 7,207,678.

(60) Provisional application No. 60/345,719, filed on Dec. 31, 2001.

(51) Int. Cl.
G03B 21/28 (2006.01)
G03B 21/14 (2006.01)
G02B 27/14 (2006.01)
G02B 5/04 (2006.01)
G02F 1/135 (2006.01)

(52) U.S. Cl. ............... 353/81; 353/33; 353/99; 359/634; 359/636; 359/834; 349/30

(58) Field of Classification Search ............... 353/81, 353/33, 98, 99; 359/634, 833, 834, 636; 349/30
See application file for complete search history.

(56) References Cited

U.S. PATENT DOCUMENTS

| | | | |
|---|---|---|---|
| 4,728,185 A | 3/1988 | Thomas | |
| 4,969,730 A | 11/1990 | van den Brandt | |
| 5,309,188 A | 5/1994 | Burstyn | |
| 5,402,184 A | 3/1995 | O'Grady et al. | |
| 5,552,922 A * | 9/1996 | Magarill | 359/224.1 |
| 5,604,624 A | 2/1997 | Magarill | |
| 6,144,498 A | 11/2000 | Bryars et al. | |
| 6,249,387 B1 | 6/2001 | Poradish et al. | |

(Continued)

FOREIGN PATENT DOCUMENTS

DE 3901166 A1 7/1990

OTHER PUBLICATIONS

T938,006 Defensive Publication, Published Sep. 2, 1975.

*Primary Examiner* — Georgia Y Epps
*Assistant Examiner* — Magda Cruz
(74) *Attorney, Agent, or Firm* — Charles A. Brill; Wade James Brady, III; Frederick J. Telecky, Jr.

(57) ABSTRACT

Prism elements having TIR surfaces placed in close proximity to the active area of a SLM device to separate unwanted off-state and/or flat-state light from the projection ON-light bundle. The TIR critical angle of these prisms is selected to affect either the off-state light or additionally, any portion of flat-state light reflected from the SLM. These TIR surfaces limit the contamination of light along the projection path, which tends to degrade the system contrast. To further improve the optical performance of the system, these TIR prisms can be attached directly to the SLM package, completely eliminating the package window.

12 Claims, 6 Drawing Sheets

U.S. PATENT DOCUMENTS

| | | |
|---|---|---|
| 6,250,763 B1 | 6/2001 | Fielding et al. |
| 6,382,799 B1 * | 5/2002 | Nishikawa et al. ........... 353/122 |
| 6,461,000 B1 | 10/2002 | Magarill |
| 6,644,813 B1 | 11/2003 | Bowron |
| 6,663,243 B2 | 12/2003 | Fielding et al. |
| 6,771,325 B1 * | 8/2004 | Dewald et al. ................ 348/743 |
| 6,873,450 B2 | 3/2005 | Patel et al. |
| 7,207,678 B2 | 4/2007 | Penn |
| 7,665,850 B2 | 2/2010 | Penn |

* cited by examiner

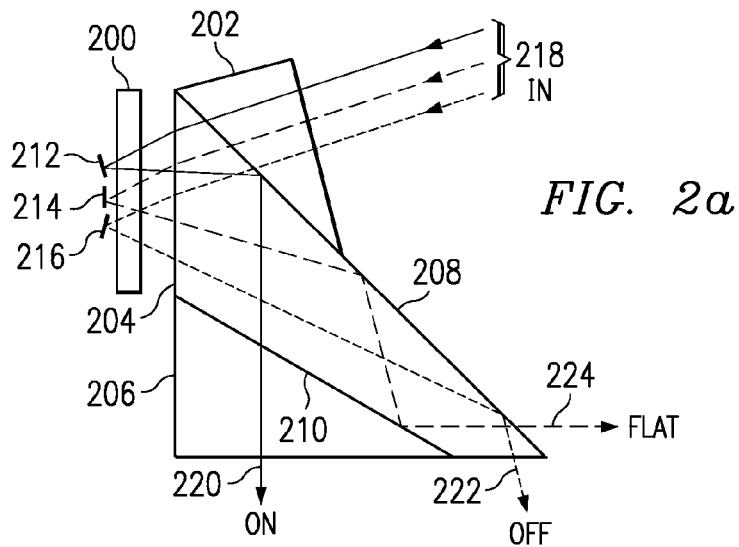
FIG. 2a
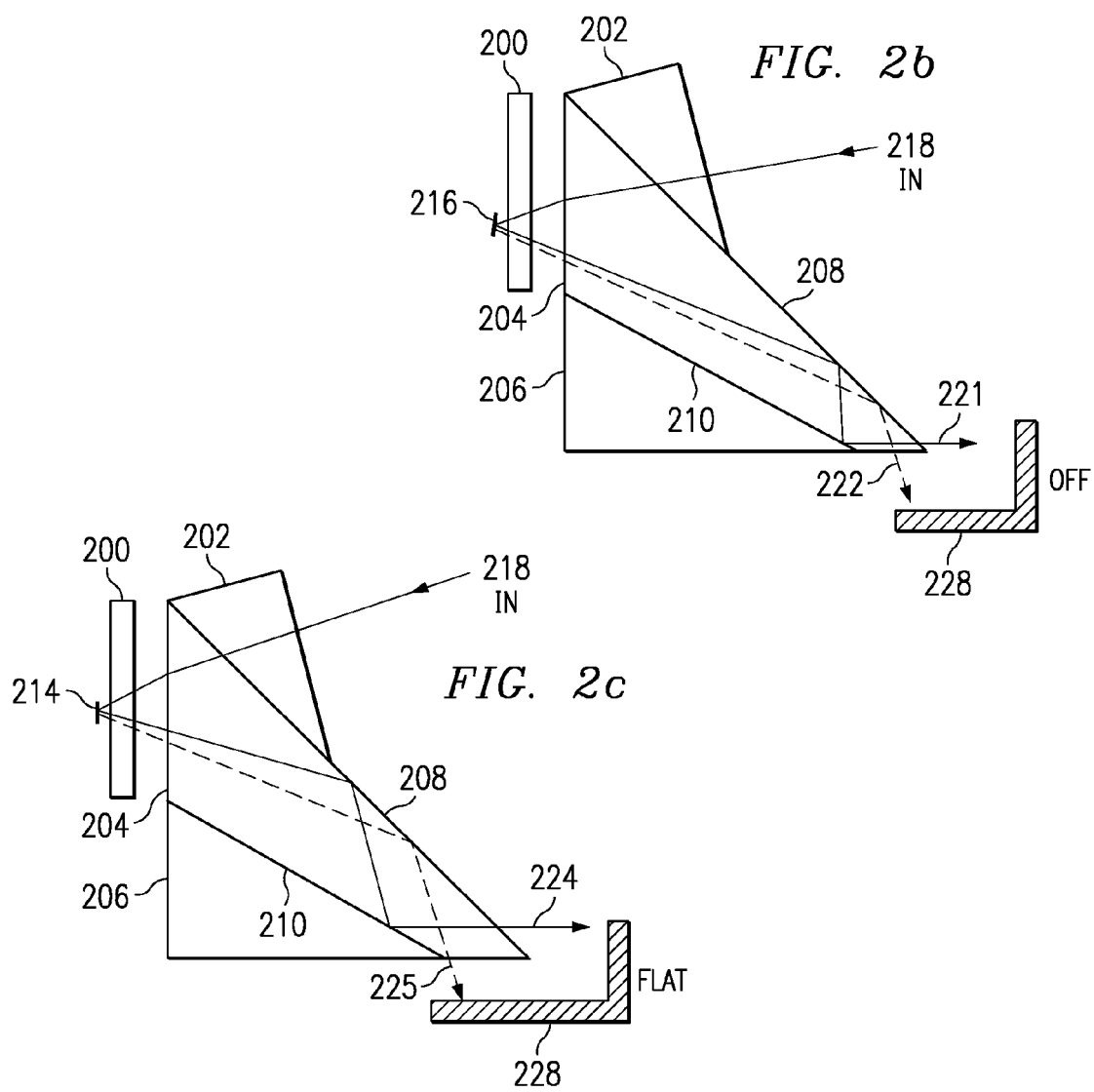
FIG. 2b
FIG. 2c

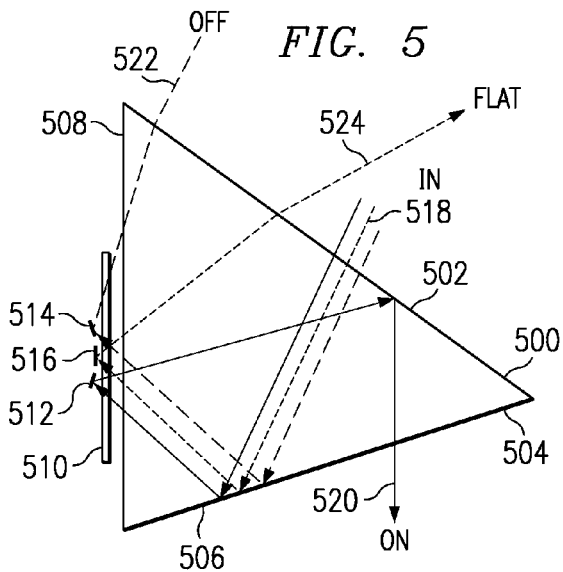
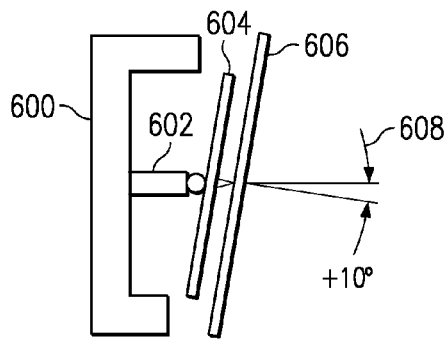
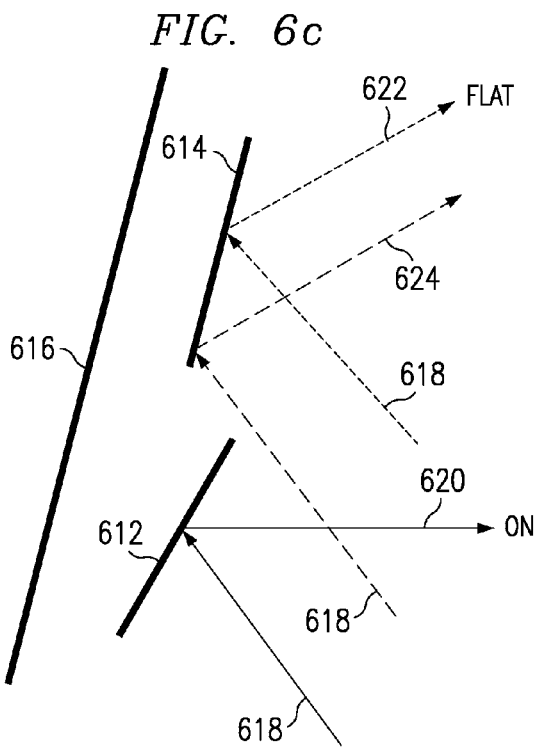
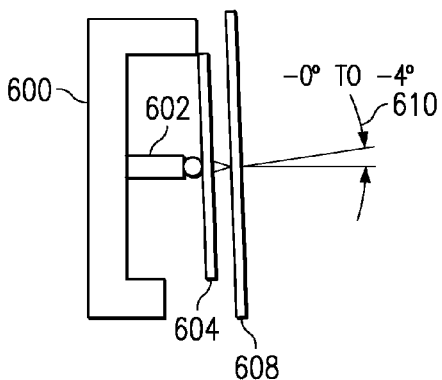

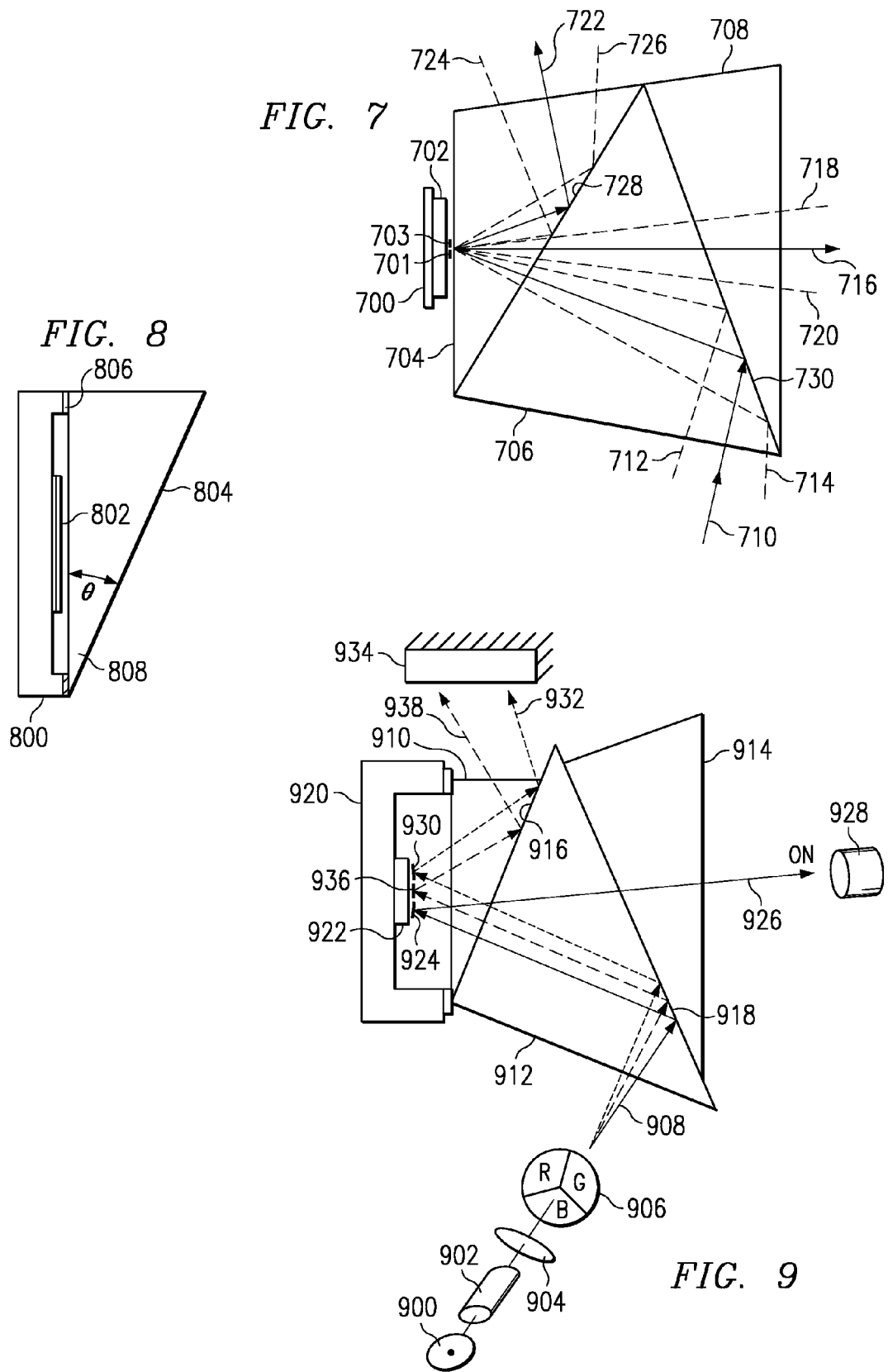

PRISM FOR HIGH CONTRAST PROJECTION

FIELD OF THE INVENTION

This application is a divisional of application Ser. No. 11/739,292, filed Apr. 24, 2007 which is a divisional of application Ser. No. 10/331,832, filed Dec. 30, 2002 now U.S. Pat. No. 7,207,678, which claims the benefit of provisional Application No. 60/345,719, filed Dec. 31, 2001.

The present invention relates to optical elements used in projection systems and more particularly to high contrast prisms, which separate unwanted light reflected from the OFF pixels from the projection illumination bundle reflected from the ON pixels.

BACKGROUND OF THE INVENTION

In a typical spatial light modulator (SLM) projection system, such as a digital micromirror device (DMD) based system, undesired off-state and flat-state light can overlap the desired image projection illumination for some distance along the optical path and is often reflected on to the screen causing a reduction in image contrast. In high power projectors, the off-state light can be of sufficient duration and magnitude to increase the thermal energy in the optics and other hardware, resulting in optical distortion, mechanical stress, and/or image misconvergence.

This unwanted light can result from scattering of light off various surfaces, such as the device package, device structure, window, and prisms. Current approaches to handle this unwanted light often use baffles or bounded apertures in the projection light path. However, bounded apertures that pass the projection light also pass any off-state and flat-state light that spatially and angularly overlap the clear aperture region. Other approaches direct the unwanted light into an optical heat sink (light trap), often reflecting off various total internal reflective (TIR) surfaces along the optical path, but do this too far along the optical path to prevent contamination of the desired projection light.

FIGS. 1a and 1b are diagrams illustrating the operation of a typical DMD light modulator. These devices are constructed on a silicon substrate 100, which contains an underlying memory structure used to control the binary state of each micromirror. The micromirror superstructure is suspended by means of torsion hinges, supported by posts 102, on top of the substrate. The superstructure consists of a yoke 104, which is attached to the torsion hinges, and a highly reflective metal micromirror 106 attached to the yoke by a mirror post. The structure is caused to tilt about the diagonal hinge axis due to electrostatic forces created by an electric field established between address pads connected to the memory structure and the yoke/mirror bias voltage. The yoke/mirror structure typically rotates from +10° 108 for ON pixels to −10° 110 for OFF pixels.

In operation, as shown in FIG. 1c, incoming light 118 typically enters the system at two times the tilt angle) (20°), such that light striking mirrors rotated +10° 112 (ON pixels) is reflected along an ON projection path 120 through a projection lens on to a display screen. On the other hand, incoming light 118 that strikes mirrors rotated −10° 114 (OFF pixels) is reflected along a second off-light path 122. Also, some of the incoming light strikes various flat surfaces and edges in and around the DMD package and is reflected 126 off the device 116 as additional unwanted light. Where adjacent mirrors are in the ON and OFF states, respectively, it is possible for some light to pass through the gap between the mirrors, getting underneath the mirror and bouncing around 124, finally exiting with some of the light 128 finding its way into the projection light path, thereby reducing the contrast of the projected image. This condition exposes itself with the background of the image being lighter than desired.

Previous solutions have attempted to improve the DMD contrast with absorptive coatings under the DMD micromirrors. Apertures have also been incorporated to filter unwanted light from the DMD and the projection path, but do not provide adequate filtration, especially for light reflecting from the underside of the off-state mirrors.

The use of a TIR surface to filter the off-state light just prior to entry into the projection lens has been tried, but this is too far along the optical path to separate out the unwanted light, and this approach does not address the dependency between early filtration of the off-state light and the opportunity that exists to reduce the DMD off-light tilt angle.

What is needed to improve the contrast in these projection systems is to separate the unwanted flat-state and off-state light from the projection light bundle immediately after the light is reflected off the surface of the DMD. The present invention discloses multiple embodiments for accomplishing this unwanted light separation. By controlling and directing the unwanted light immediately to a light absorbing heat sink, the projection light remains free of these offensive light rays, and as a result can be optically and geometrically optimized for image projection to the screen. Also, to further improve the etendue and lumen output of a projection system, an asymmetric DMD having micromirrors that tilt +x degrees (typically +10°) in the ON direction, but less than x degrees (typically 0 to −4°) in the OFF direction and coupled to optical prisms having OFF light TIR surfaces in close proximity to the light modulators, is disclosed. This approach provides a very fast DMD based projection system that optically switches the unwanted light into a heat sink at a predetermined threshold value. A DMD having a larger ON-mirror tilt angle and a near-flat OFF-mirror tilt angle coupled to the optics of the present invention, having TIR surfaces to direct the unwanted off-light immediately away from the projection light bundle can provide an optimal solution for improving the contrast in projection systems. Finally, in order to provide a low-cost solution to the unwanted light separation problem, a single element prism embodiment is also disclosed in the present invention.

SUMMARY OF THE INVENTION

This invention discloses prism elements having TIR surfaces placed in close proximity to the active area of a SLM to separate the projection light bundle from off-state or flat-state light, or both. Embodiments for both single-SLM and multiple-SLM projection systems are disclosed, which provide high contrast projection solutions. The critical angle of the TIR surface in these prisms is selected to affect either the off-state light or additionally, any portion of flat-state light reflected from the SLM. These TIR surfaces are placed so as to immediately reflect this unwanted light as it comes off the SLM, thereby preventing the contamination of light along the projection path, which tends to degrade the system contrast. For low-cost projection systems, a single element TIR prism having two TIR surfaces is also disclosed.

According to one embodiment of the present invention, an optical system is provided. The optical system comprising a first spatial light modulator, with at least one modulator element operable to receive light and selectively direct said received light in at least a first direction and a second direction, a first surface to direct a first group of wavelengths to said first spatial light modulator, and an interface between one said first surface and said spatial light modulator such that light directed to said spatial light modulator passes through said interface and light directed in said first direction by said spatial light modulator is reflected by said interface, thereby separating said light directed in said first direction from light directed in said second direction.

Furthermore, the TIR prisms can be attached directly to the SLM package, completely eliminating the package window. This not only allows for the unwanted light to be removed from the system sooner, but also other system contamination such as dust and moisture is reduced and the number of optical elements that the light has to pass through, as well as the system size and cost are reduced.

Finally, an embodiment where the TIR prisms are coupled to DMD(s) having asymmetric mirrors, which tilt through a larger angle for the ON light to provide high etendue and lumen output, but through a near-zero degree angle for the OFF light is disclosed, thereby improving the separation of any unwanted light from the off and/or flat state light. In this approach, as the DMD mirrors transition from ON to OFF or OFF to ON states, the unwanted light switches to the off-light path once a specific TIR threshold is reached.

BRIEF DESCRIPTION OF THE DRAWINGS

For a more complete understanding of the present invention, and the advantages thereof, reference is now made to the following descriptions taken in conjunction with the accompanying drawings, in which:

FIG. 2a is a drawing showing the first embodiment of the present invention for a TIR prism assembly used to separate unwanted off-state and flat-state light from the projection ON light bundle in a single-SLM projection display system.

FIG. 2b is a drawing of the TIR prism of FIG. 2a showing how unwanted light from OFF surfaces in and around the SLM is separated from the ON light bundle and directed to an optical heat sink.

FIG. 2c is a drawing of the TIR prism of FIG. 2a showing how unwanted light from FLAT SLM pixels and other flat surfaces are separated from the ON light bundle and directed to an optical heat sink.

FIG. 5 is a drawing showing a fourth embodiment of the present invention for a low-cost TIR prism, having a single prism element with two TIR surfaces to separate the unwanted off-state and/or flat-state light from the projection light path and route it to an optical heat sink.

FIGS. 6a and 6b are drawings illustrating the operation of a DMD having asymmetric micromirrors which tilt +10° in the ON state and less than 10° in the OFF state.

FIG. 6c is a drawing showing how some of the incoming light is prevented from getting underneath the off-state mirror when the off-state mirror is kept in a near-flat position.

FIG. 7 is a drawing showing the asymmetric DMD of FIGS. 6a and 6b coupled with the preferred TIR prism of the present invention to provide fast separation of unwanted off-state and/or flat-state light from the projection light path.

FIG. 8 is a drawing illustrating the TIR prism of FIG. 7 attached directly to the asymmetric DMD and showing the critical angle of the first TIR surface chosen to switch the unwanted light to an optical heat sink when the mirror tilts past a predetermined threshold.

FIG. 9 is a block diagram for a single-SLM projection system, which uses the TIR prisms of the present invention to separate the unwanted light from the off-state and/or flat-state from the projected light bundle.

DETAILED DESCRIPTION OF THE PREFERRED EMBODIMENTS

Figure 1A:
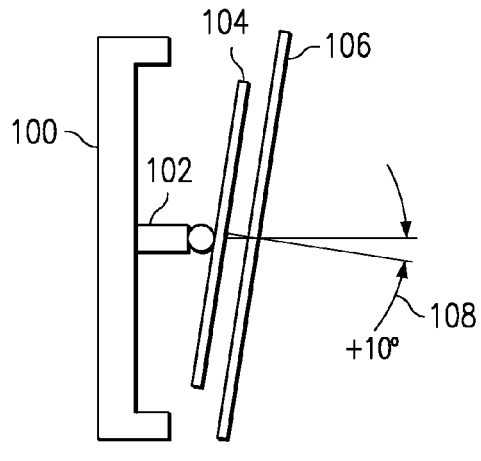
FIGS. 1a and 1b are drawings illustrating the operation of a typical DMD.

This invention discloses prism elements having total internal reflective (TIR) surfaces placed in close proximity to the active area of a SLM to separate the projection light bundle from off-state or flat-state light, or both simultaneously. Embodiments that provide high contrast projection solutions are disclosed for both single-SLM and multiple-SLM projection systems. The TIR critical angle is selected to affect either the off-state light or additionally, any portion of flat-state light reflected from the SLM. These TIR surfaces are placed to immediately reflect this unwanted light as it conies off the SLM, thereby preventing the contamination of light along the projection path, which tends to degrade the system contrast.

FIG. 2a is a drawing showing the first embodiment of the present invention for a TIR prism assembly, which separates unwanted off-state and flat-state light from the projection ON light bundle in a single SLM projection display system. This configuration consists of a three-element prism coupled to a single SLM 200. Incoming illumination 218 enters through a first prism element 202, which directs light on to the active surface of SLM 200. This first prism 202 is attached to the upper portion of a second larger prism 204, which has a first TIR surface 208 and a second TIR surface 210, for separating and routing the various types of reflected light, coming off the surface of the SLM, out of the prism assembly without contaminating the desired ON projection light. A third prism 206 is attached to the bottom side of prism 204 to provide an equal optical working distance on the input and output side of the projection cone for the ON pixel projection light.

In operation, the first prism element 202 directs the incoming light 218 on to the surface of the SLM 200. Light reflected from the ON pixels 212 passes back through prism 204, striking the first TIR surface 208 at an angle greater than its critical angle, thereby reflecting off the first TIR surface at an angle less than the critical angle of the second TIR surface 210, thereby passing through this TIR surface, through the third prism 206, along the ON light projection path 220. In a projection system, this light is then coupled through a projection lens on to a display screen. The purpose of this third prism is to provide an equal optical working distance on both the input and output sides of the projection cone.

Light reflecting from the OFF pixels 216 is shown in FIG. 2a and in more detail in FIG. 2b. Again the incoming light 218 passes through the input prism 202 where it is directed on to the active area of the SLM 200. For the case of the OFF pixels 216, this light is reflected back into prism 204 where it is further reflected off TIR surface(s) and out of the prism assembly into an optical heat sink 228 (light trap). Depending on the location of a particular pixel, this OFF light may be reflected off the first TIR surface 208 and directly out of the prism 222 or it may reflect off both the first 208 and second 210 TIR surfaces, out of the prism 221 into the optical heat sink 228. The important thing is that light from the OFF pixels 216 is separated from the projection light reflecting from the ON pixels 212 and removed from the system with minimal contamination of the projected light 220.

Similarly, light reflecting off flat surfaces found in, around, and under the pixels is also separated from the ON pixel projected light 220 and directed into the optical heat sink 228, as shown in FIG. 2a and in more detail in FIG. 2c. Here the incoming light 218 passes through the input prism 202 where it is directed on to the active area of the SLM 200. Light striking surfaces within the SLM package at different angles (near flat) from either the ON or OFF pixels can also be reflected back into the prism assembly. As with the OFF pixels, this light is further reflected off TIR surface(s) and out of the prism assembly into an optical heat sink 228 (light trap). This FLAT light may be reflected off the first TIR surface 208 and directly out of the prism 225 or it may reflect off both the first 208 and second 210 TIR surfaces, one or more times, out of the prism 224 into the optical heat sink 228. Again, the important thing is that light from the OFF pixels 221,222 and flat surfaces 224,225 is separated from the ON projection light 220 and removed from the system.

Figure 3:
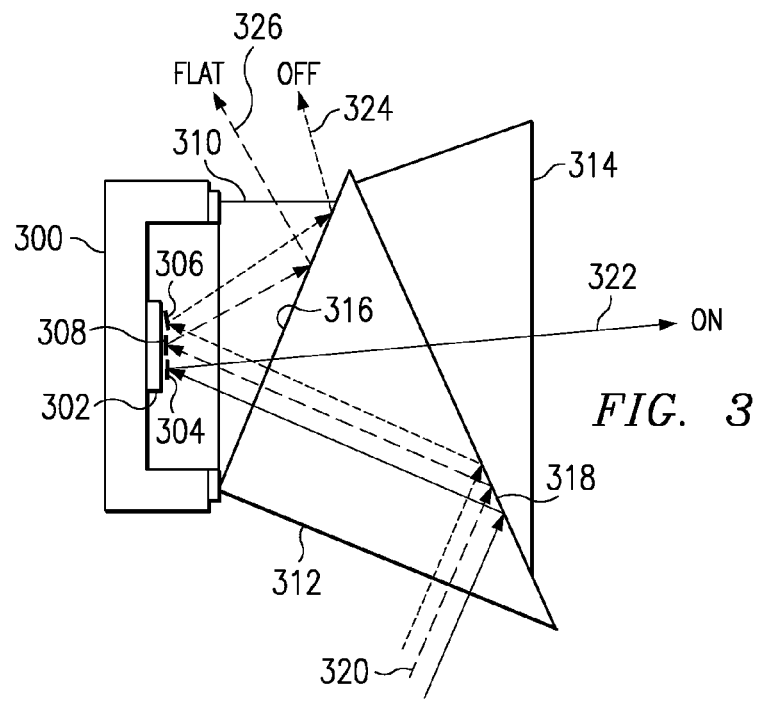
FIG. 3 is a drawing showing the preferred embodiment of the present invention for a TIR prism, consisting of a three element prism attached directly to the SLM package, in place of the typical package window, which has an off-state and/or flat-state TIR prism in close proximity to the SLM.

FIG. 3 is a drawing showing a second preferred embodiment of the present invention for a TIR prism, which uses a three element prism attached directly to the SLM package in place of the typical package window. In this case, an off-state and/or flat-state TIR surface is located as close as possible to the SLM in order to separate the unwanted light from the OFF pixels and the flat surfaces around the pixel, from the ON pixel projected light. This embodiment consists of a first prism element 310, a second prism element 312, and a prism element third 314, which are bonded together to provide a first TIR surface 316 and a second TIR surface 318. The first prism element 310 is attached directly to the SLM package 300, completely eliminating the conventional optical window normally used with SLM devices. Incoming light 320 enters the second prism element 312 at an angle greater than the critical angle of the second TIR surface 31S and is reflected off this TIR surface, through the first prism element 310 on to the active surface of a SLM 302. In the case of ON-state SLM pixels 304, light is reflected back into the prism assembly at an angle less than the critical angle of both the first and second TIR surfaces 316, 318 and therefore passes through the assembly along the projection path 322. In a projection system, this light is coupled into a projection lens and focused on to a display screen.

On the other hand, light reflected from the OFF pixels 306 and flat pixels 308, which may be transitioning from ON to OFF state or the OFF to ON state, as well as flat surfaces on and around the device, are reflected back into the prism assemble at an angle greater than the critical angle of the first TIR surface 316 and as a result are immediately reflected out of the assembly. Both this OFF-state light 324 and FLAT-state light 326 are directed into an optical heat sink and removed from the system.

This approach maximizes system contrast and image quality. The elimination of unwanted light early in the optical path reduces scatter and thermal stresses from optics and mounting hardware around the prism and in the projection path.

The TIR angles may be selected to affect only the off-state light or, additionally, any portion of flat-state and intermediate angles of light reflecting from the SLM surface. For example, a shallow TIR angle of 25 degrees will operate primarily on the higher angled off-state light rays. A larger TIR angle of 33 degrees will filter additional flat-state light. Additionally, it is possible to select an optimum index of refraction for the TIR elements that, along with the TIR angle, will further promote the separation of the projection light from other light angles.

It is important to note that by attaching the prism assembly directly to the SLM, dirt, condensation, and other contamination that otherwise may get between the prism and the SLM window, is largely eliminated. The elimination of the SLM window also means one less optical surface that the ON projection light has to traverse. In addition, component quantity, size and cost are all reduced. Also, the first optical surface can be farther away from the focal point of the SLM active area without compromising the element's thickness and structural integrity. This is optically preferred, since any blemishes are pushed out of focus.

Figure 4:
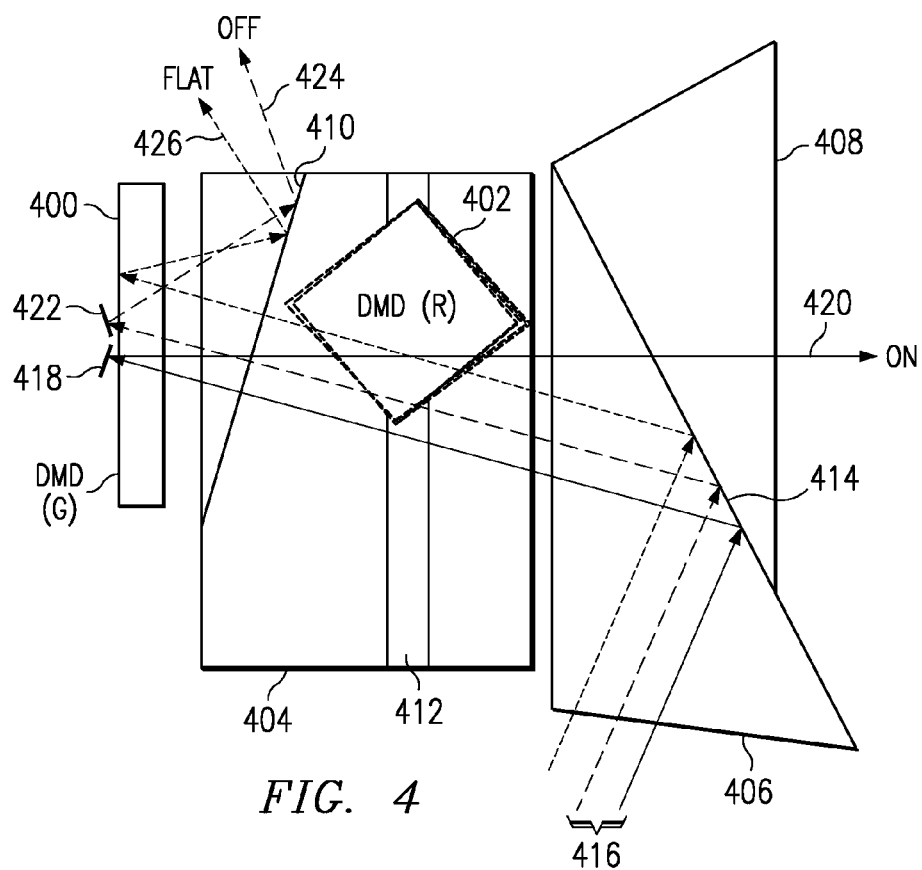
FIG. 4 is a drawing showing a third embodiment of the present invention for a TIR prism assembly used to separate unwanted off-state and flat-state light from the projection ON light bundle in a multiple-SLM projection display system. This prism has TIR surfaces to directly receive the unwanted light from the multiple SLMs and direct this light to an optical heat sink.

FIG. 4 is a drawing showing a third embodiment of the present invention for a TIR prism assembly where unwanted off-state and flat-state light is separated from the projection ON light bundle in a multi-chip [two or more, three shown for red (R), (G), (B)] SLM projection display system. This prism assembly incorporates TIR surfaces 410, 412 as close as possible to the SLM devices 400, 402 to directly receive the unwanted light from the SLMs and direct this light to an optical heat sink (not shown). The assembly consists of prism 406, 408 for getting white light 416 into the system and getting the projected ON light 420 out of the system into a projection lens (not shown) in a display application, a color splitting/recombining prism assembly 404 for splitting the white light 416 into the three R-G-B color beams, and three respective red (R) 402, green (G) 400, and blue (B) (not shown but located on the opposite side of the prism from the red device). The three prism elements have additional TIR surfaces 410, 412 for green and red, respectively, (blue not shown) placed as close to the SLM devices as possible for immediately separating the unwanted OFF and flat light from the ON projected light.

In operation of a three SLM system, white light 416 enters prism 406 and at angle greater than the critical angle of TIR surface 414 and is reflected into the color splitting prism assembly 404, where the light is split into three (R, G, B) beams by means of TIR surfaces and is then reflected on to the active surface of the three respective SLMs. Reflected light from ON pixels (green light from pixel 418 shown) is then recombined in the prism assembly 404 and reflected at an angle less than the critical angle of the TIR surface 414 back through the input/output prisms 406/408, along the projection path 420. Output prism 408 provides an equal working distance for both the input and output side of the projection cone.

Light reflected from the OFF pixels 422 (shown for green light only) enters the respective color prisms at an angle greater than the critical angle of off-light TIR surface and is immediately reflected 424 (shown for green light only) out of the system into an optical heat sink, effectively separating the unwanted OFF light from the desired ON projection light 420. Likewise, light reflected from the FLAT surfaces in the device package, enters the respective color prisms at an angle greater than the critical angle of off-light TIR surface and is immediately reflected 426 out of the system into an optical heat sink, effectively separating this unwanted FLAT light from the desired ON projection light 420. These high-brightness multi-chip display applications particularly benefit from the high contrast, precision, and value added gained by removing the unwanted light as soon as possible after being reflected from the surface of the SLM.

FIG. 5 is a drawing showing a fourth embodiment of the present invention for a low-cost, single-element TIR prism having two TIR surfaces to separate the unwanted off-state and/or flat-state light from the projection light bundle and route it to an optical heat sink. Although somewhat larger is physical size, a single TIR prism element tends to be lower cost and is therefore attractive in lower end systems where cost may be more important than size. This configuration consists of the single prism, which has a first side 500 with a first TIR surface 502, a second side 504 with a second TIR surface 506, a third side 508, and a SLM device 510 mounted in close proximity to the third side 508 of the prism. Optionally, as in the earlier cases, the SLM package can be attached directly to the third side 508 of the prism.

In operation, incoming light 518 enters the through the first side 500 of the prism at an angle greater than the critical angle of the second TIR surface 506 and reflects off this TIR surface on to the active area of the SLM device 510. Light striking the ON pixels 512 of the SLM is reflected off at an angle greater than the critical angle of the first TIR surface 502, located on the first side 500 of the prism, and reflects out of the second side 504 of the prism along a projection path 520. In a display application, this ON projection light is coupled into a projection lens. On the other hand, light reflected from the OFF pixels 514 of the SLM strike the first TIR surface 502, located on the first side 500, at an angle less than its critical angle and passes through the surface, being bent along a first off-light path 522. Similarly, light from flat-state mirrors 516 making the transition from On to OFF or OFF to ON and from other flat surfaces in, around, and under the pixels are reflected on to the second TIR surface 502 at a slightly different angle, but still less than the surface's critical angle, and also passes through the surface, being bent along a second flat-light path 524. As in the previous cases, this unwanted off-light and flat-light is directed into an optical heat sink and discarded.

Alternatively, the two output paths may enable an optical switch function. Also, other light paths are possible besides the one discussed in this example, such as light entering the second surface 504 with two resultant outputs that exit the first surface 500 as spatial or angular separate bundles.

By optimally using the available surfaces in a single prism element, the different light paths and bundles can be separated without the introduction of additional elements, surfaces and assembly steps. As a result, this solution reduces the complexity of design and production, compared to other approaches. Even though the path length in glass may be larger than other designs, the cost of hardware and assembly is significantly reduced. Additionally, it is anticipated that both telecentric and non-telecentric architectures can take advantage of this embodiment of the invention to enable further improvements in contrast and light output.

Figure 1B:
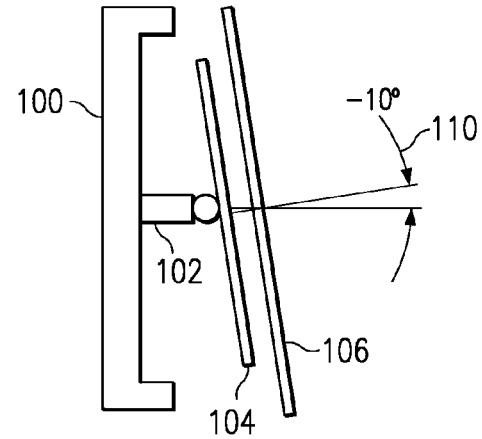
Figure 1C:
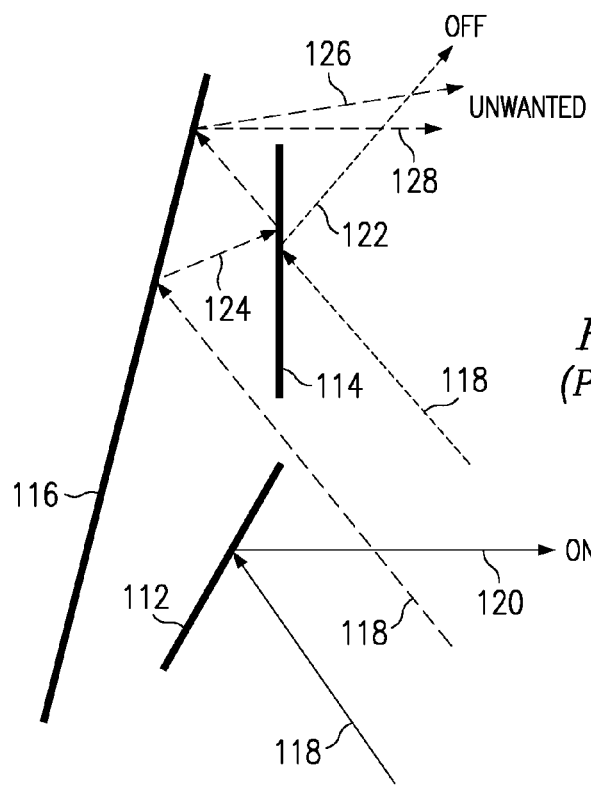
FIG. 1c is a sketch showing how incoming light can get underneath the off-state mirrors and reflect out into the projection light path, degrading the contrast of the image.

FIGS. 6a through 6c are drawings illustrating the operation of a DMD having asymmetric micromirrors which tilt typically +10° in the ON state and less than 10° (typically 0° to −4°) in the OFF state. In a typical DMD projector, as discussed in FIG. 1, the DMD tilt angles are symmetric about the projection axis, which in turn is nearly perpendicular to the DMD active mirror array. The DMD tilt angle in both On-state and off-state conditions is normally equal in magnitude to ½ the projection cone angle. As an example, for a desired projection f-number of f/2.9, the included projection light is a 20-degree cone and the DMD tilt angle is typically +10 degrees for on-state and −10 degrees for off-state.

Although larger degrees of DMD tilt angle enables increased etendue and lumen output, the problems encountered at the DMD tend to be increased when the tilt angles are increased, including increased bias and switching voltage, slower switching times, larger required micromirror gap width, and higher mechanical stress/strain on the torsion hinges. Also, higher tilt angles affect contrast by allowing more light to expose the region and components under the tilted mirror in the off-state, as discussed in FIG. 1c. The illumination angle combined with the DMD's off-state tilt angle cause much of this unwanted exposure, resulting in light scatter and inevitable loss of contrast. Additionally, any light exposing the underlying structure that is not reflected is absorbed, causing thermal and reliability problems.

Therefore, it is beneficial to minimize the off-state DMD tilt angle, while achieving the optimum on-state tilt angle required for optimal system etendue and image quality. The DMD shown in FIGS. 6a and 6b accomplish this by providing a mirror that tilts approximately +10° 608 in the ON direction (FIG. 6a), but only 0° to −4° 610 in the OFF direction (FIG. 6b). The DMD consists of a substrate 600, a mirror assembly hinge support post 602, a rotating yoke 604, and a highly reflective micromirror 606 attached to the yoke. The yoke/mirror assembly rotates from +10° 608 in the ON state to 0° to −4° 610 in the OFF state.

FIG. 6c illustrates how keeping the off mirror 614 in the near-flat position reduces the size of the large gap between mirrors and prevents most of the incoming light 618 from getting underneath the mirror by reflecting it off the device 616 surface as flat/off-light 622,624. The incoming light 618 that strikes the ON state mirror 612 is reflected off the mirror along the projection display path 620. By maintaining a large ON-state tilt angle, the system etendue and lumen output is maintained and by having a near-flat OFF-state tilt angle, less light gets under the OFF mirror, preventing scattering of unwanted light that might otherwise get into the projection light bundle and lower the system contrast.

FIG. 7 is a drawing showing a fifth embodiment of the present invention for a TIR prism, which uses a three prism elements attached directly to the package of an asymmetric DMD, discussed in FIG. 6, in place of the normal package window. An off-state and/or flat-state TIR surface is mounted as close as possible to the DMD in order to separate the unwanted light outside the projection cone, coming from the OFF pixels and the flat surfaces within the device package, from the desired light within the projection cone. In this case, OFF mirrors 703 are at or near the flat-state, with the OFF tilt angle being 0 to −4°. This embodiment also uses three prism elements, a first 704, a second 706, and a third 708 element, which are bonded together to provide a first TIR interface 728 and a second TIR interface 730. The first prism element 704 is mounted in close proximity or directly to the DMD package 700, placing the first TIR surface for removing unwanted light as close as possible to the DMD. Incoming light 710, bounded by the cone boundaries 712/714, enters the second prism element 706 at an angle greater than the critical angle of the second TIR interface 730 and is reflected off the TIR surface, through the first prism element 704, on to the active surface of the DMD 702. In the case of DMD pixels that are in an ON state 701, light is reflected back into the prism assembly at an angle less than the critical angle of both the first and second TIR surfaces 728, 730 and therefore passes through the assembly along the ON light projection path 716, which is bounded by cone boundaries 718/720. In a projection system, this light is coupled into a projection lens and focused on to a display screen.

On the other hand, light reflected from the OFF pixels 703, as well as flat surfaces on and around the device, are reflected back into the prism assemble at an angle greater than the critical angle of the first TIR surface 728 and immediately reflected out of the assembly. This unwanted light 722, hounded by cone boundaries 724/726, is directed into an optical heat sink and removed from the system, where it is discarded.

In this case, the DMD is constructed with the off-state tilt angle chosen to cause internal reflection of unwanted light within the filter prism. Depending on the prism properties and illumination angle, the DMD off-state angle is expected to be between 0 and −4 degrees. When the DMD on-state 701 tilt angle is +10 degrees for an f/2.9 projection cone, the total included DMD tilt is between 10 and 14 degrees, compared to that of conventional DMD included tilt angles of 20 degrees. The DMD off-state 703 tilt angle may be higher or lower, depending on optical and mechanical requirements, but will always be less in absolute angle than the DMD on-state angle. This will enable the system to achieve better thermal and optical performance compared to conventional symmetric DMD tilt angles.

FIG. 8 shows a configuration whereby the prism filter element 804 is attached 806 directly to the DMD package 800 to enable early separation of DMD 802 off-state light from the projection light path. It is anticipated that other types of optical elements, such as holographic, grating or lens aperture filters, may be candidates for the necessary filtering function of the off-state light. In this example, the TIR critical angle, θ, required for use in the system is as follows:

for a f/3 projection system→θ=34.25-degrees
for an f/2.5 projection system→θ=33.0-degrees.

FIG. 9 is a block diagram for a single-SLM projection system, which uses the TIR prism(s) of the embodiments of the present invention to separate the unwanted light from the off-state and/or flat-state from the projected light bundle. The system shown in the example is comprised of a white light source 900 coupled into integrating optics 902, to collect as much of the light as possible, and then through condensing optics 904 to bring the light to focus at a spot near the perimeter of a color filter wheel 906. Sequential red (R), green (G), blue (B), and optional white (transparent filter element, not shown) light 908 from the color filter wheel 906 is then directed into one side of a prism assembly. The prism assembly in this example consists of a first element 910 bonded to one side of a second element 912, having a first TIR surface 916 at the interface of the two elements, and a third element 914 bonded to a second side of the second element 912, having a second TIR surface 918 at the interface of these two elements. The window seal surface of a DMD package 920 is attached directly to the outside surface of the first prism element 910 or optionally, a packaged DMD with optical window can be placed as close as possible to the first prism element surface. Finally, an optical heat sink 934 is located above the first prism element 910 to collect the unwanted reflected light from the system.

In operation, the sequential color light 908 enters the second prism element 912 at an angle greater than the critical angle of the second TIR surface 918 and is reflected off the surface on to the active surface of the DMD 922. Light from the ON pixels 924 is modulated and reflected at an angle less than the critical angles of the two TIR surfaces, back through the prism assembly, along an ON projection path 926, into a projection lens 928. However, light reflected from the OFF pixels 930, flat pixels 936, and other flat surfaces inside the device package enters the prism assembly at an angle greater than the critical angle of the first TIR surface 916 and is immediately reflected (OFF 932, FLAT 938) out of the prism into the optical heat sink 934. Since the separation of the unwanted light from the projection light bundle occurs immediately as the light enters the prism assembly, the projection light has minimal contamination and therefore the system contrast remains high. Any of the TIR prism embodiments of the present invention can be incorporated into this single-DMD projection display system.

Figure 10:
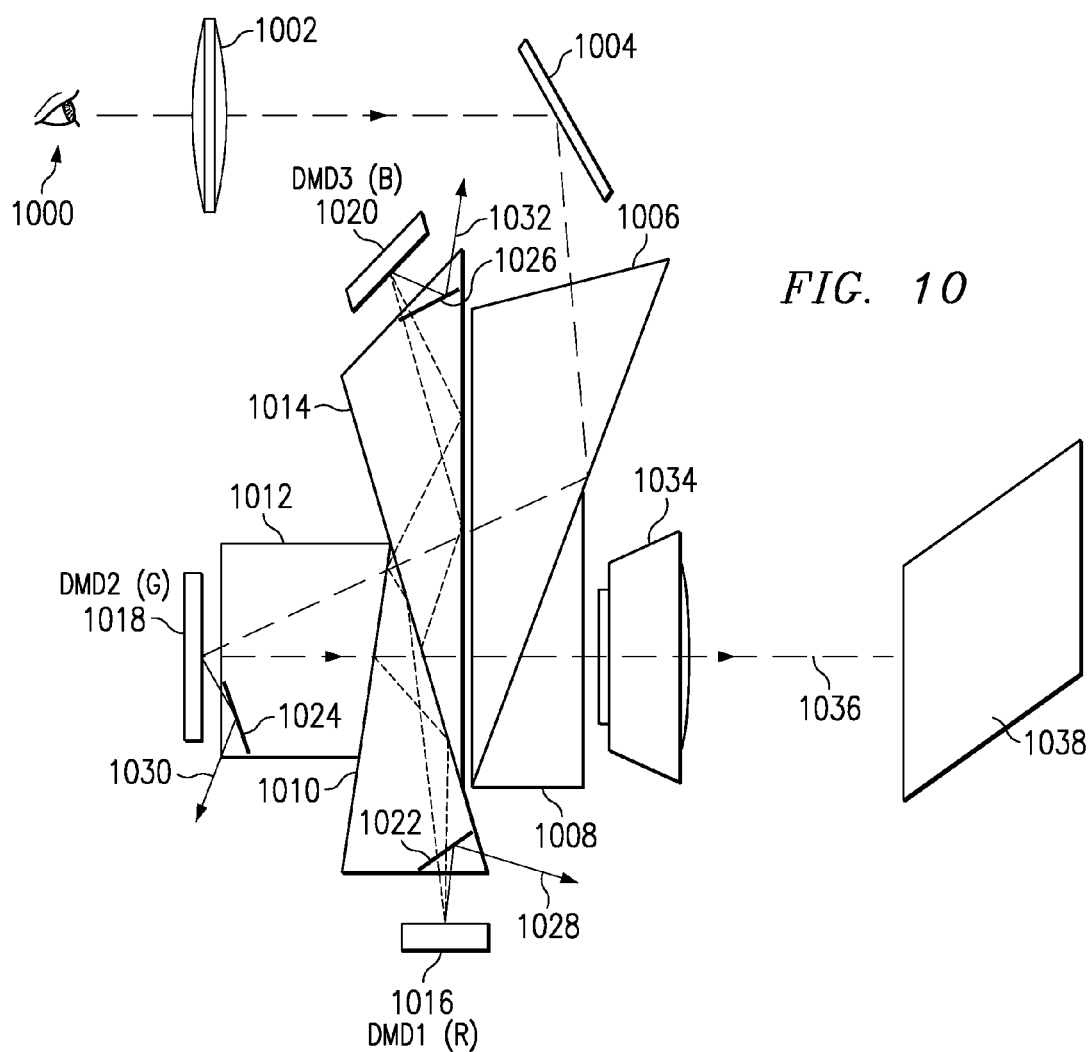
FIG. 10 is a block diagram for a multiple-SLM projection system, which uses the TIR prisms of the present invention to separate the unwanted light from the off-state and/or flat-state from the projected light bundle in each color prism immediately after the unwanted light is reflected from the SLM.

FIG. 10 is a block diagram for a multiple (two or more)-DMD projection system, which uses the TIR prisms of the present invention to separate the unwanted light from the off-state and/or flat-state from the projected light bundle in each color prism immediately after the unwanted light is reflected from the DMD. This example is for a three DMD high-contrast, high-brightness projection system. The prism assembly incorporates TIR surfaces 1022, 1024, and 1026 as close as possible to the DMD devices (red 1016, green 1018, and blue 1020) to directly receive the unwanted light from the DMDs and direct this light to an optical heat sink (not shown). The assembly consists of a white light source 1000, which couples light through condensing optics 1002 and off a turning mirror 1004 into an input TIR prism 1006, where the light is internally reflected into color splitting/recombining prisms 1010, 1012, 1014. These color prisms split the light into three continuous, simultaneous red, green, and blue light bundles, which are reflected off TIR surfaces on to respective red 1016, green 1018, and blue 1020 DMDs. Light that is modulated and reflected from the ON pixels of the three DMDs is reflected back into the prisms where it is recombined and reflected through an output prism 1008, to provide an optimal optical working distance, through a projection lens 1034, along a projection path 1036, on to a display screen 1038.

On the other hand, light reflected from the OFF pixels and/or from flat surfaces of the three DMDs enter the respective prisms, at an angle greater than the critical angle of additional TIR surfaces 1022, 1024, 1026 for removing unwanted light, and is immediately reflected out of the prisms as unwanted light 1028, 1030, and 1032, away from the respective projection light bundles, into optical heat sinks.

While this invention has been described in the context of five embodiments, it will be apparent to those skilled in the art that the present invention may be modified in numerous ways and may assume embodiments other than that specifically set out and described above. Accordingly, it is intended by the appended claims to cover all modifications of the invention that fall within the true spirit and scope of the invention.

What is claimed is:
1. An optical system comprising:
    a first spatial light modulator, said spatial light modulator having at least one modulator element operable to receive light and selectively direct said received light in at least a first direction and a second direction;
    a first surface to direct a first group of wavelengths to said first spatial light modulator;
    an interface between one said first surface and said spatial light modulator such that light directed to said spatial light modulator passes through said interface and light directed in said first direction by said spatial light modulator is reflected by said interface, thereby separating said light directed in said first direction from light directed in said second direction.
2. The optical system of claim 1, said spatial light modulator comprising a micromirror device.

3. The optical system of claim 1, said spatial light modulator comprising a liquid crystal device.

4. The optical system of claim 1, said spatial light modulator comprising a micromirror device having an ON state tilt angle greater than an OFF state tilt angle.

5. The optical system of claim 1, said spatial light modulator comprising a micromirror device having an ON state tilt angle less than an OFF state tilt angle.

6. The optical system of claim 1, said first group of wavelengths comprising a subset of the wavelengths striking said first surface.

7. The optical system of claim 1, said interface comprising a TIR interface.

8. The optical system of claim 1, comprising:
a second spatial light modulator; and
a second surface to direct a second group of wavelengths to said second spatial light modulator.

9. The optical system of claim 8, comprising:
a second interface between said second surface and said second spatial light modulator.

10. The optical system of claim 9, said second interface comprising a TIR interface.

11. The optical system of claim 8, comprising:
a third spatial light modulator; and
a third surface to direct a third group of wavelengths to said third spatial light modulator.

12. The optical system of claim 11, comprising:
a second interface between said second surface and said second spatial light modulator; and
a third interface between said third surface and said third spatial light modulator, wherein at least one of said first, second, and third interfaces are TIR interfaces.

* * * * *